US011604625B2

(12) United States Patent
Bzoch

(10) Patent No.: US 11,604,625 B2
(45) Date of Patent: *Mar. 14, 2023

(54) DYNAMIC VALIDATION FRAMEWORK EXTENSION

(71) Applicant: Oracle International Corporation, Redwood Shores, CA (US)

(72) Inventor: Pavel Bzoch, Prague (CZ)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 6 days.

This patent is subject to a terminal disclaimer.

(21) Appl. No.: 17/466,913

(22) Filed: Sep. 3, 2021

(65) Prior Publication Data
US 2021/0397417 A1    Dec. 23, 2021

Related U.S. Application Data

(63) Continuation of application No. 16/809,025, filed on Mar. 4, 2020, now Pat. No. 11,113,033.

(51) Int. Cl.
G06F 8/30      (2018.01)
G06F 8/20      (2018.01)

(52) U.S. Cl.
CPC .............. G06F 8/315 (2013.01); G06F 8/24 (2013.01)

(58) Field of Classification Search
CPC ................................. G06F 8/315; G06F 8/24
USPC ......................................................... 717/106
See application file for complete search history.

(56) References Cited

U.S. PATENT DOCUMENTS

| 5,732,263 | A  | * | 3/1998  | Havens ................. G06F 9/449 |
| 6,898,782 | B1 |   | 5/2005  | Brodsky et al. |
| 6,973,625 | B1 |   | 12/2005 | Lupo et al. |
| 7,143,416 | B1 | * | 11/2006 | Nachef ................ G06F 9/4488 |
|           |    |   |         | 719/315 |
| 7,451,433 | B2 |   | 11/2008 | Halpern |
| 7,546,571 | B2 |   | 6/2009  | Mankin et al. |
| 10,977,008| B1 | * | 4/2021  | Houlemarde ......... G06F 16/211 |
| 11,113,033| B1 |   | 9/2021  | Bzoch |
| 2002/0188941 | A1 |   | 12/2002 | Cicciarelli et al. |

(Continued)

OTHER PUBLICATIONS

Title: FLAX: Systematic Discovery of Client-side Validation Vulnerabilities in Rich Web Applications, author: P Saxena, published on 2010.*

(Continued)

Primary Examiner — Chameli Das
(74) Attorney, Agent, or Firm — Kilpatrick Townsend & Stockton LLP

(57) ABSTRACT

A programming language framework may be enhanced to provide for dynamic validation. Dynamic validation allows the validator function for any variable to be selected at runtime rather than statically declared at programming-time. Instead of annotating a variable with an annotation that refers to a specific validator function or constraint type, programmers can annotate a variable with an annotation that indicates that the validator function will be selected dynamically at runtime. When a runtime instance of the variable is created, the programming language framework may identify the dynamic validation annotation on the variable, and then use the runtime values in the variable to determine which validator function(s) should be used.

19 Claims, 19 Drawing Sheets

(56) References Cited

U.S. PATENT DOCUMENTS

| | | | |
|---|---|---|---|
| 2004/0019586 A1* | 1/2004 | Harter | G06F 16/289 |
| 2004/0210592 A1 | 10/2004 | Ciolfi et al. | |
| 2005/0278710 A1 | 12/2005 | Lucas et al. | |
| 2007/0038890 A1 | 2/2007 | El Far et al. | |
| 2008/0059949 A1 | 3/2008 | Matic | |
| 2009/0183021 A1* | 7/2009 | Arnold | G06F 11/3608 |
| | | | 714/2 |
| 2010/0138778 A1 | 6/2010 | Dew an et al. | |
| 2010/0198844 A1 | 8/2010 | Ribbe et al. | |
| 2010/0325597 A1 | 12/2010 | Arsintescu | |
| 2012/0173490 A1 | 7/2012 | Gould et al. | |
| 2018/0084075 A1 | 3/2018 | Ron et al. | |
| 2019/0073430 A1* | 3/2019 | Webster | G06F 16/25 |

OTHER PUBLICATIONS

*Declaring and Validating Bean Constraints, Chapter 2*, Hibernate Validator, Available Online at: https://docs.jboss.org/hibernate/validator/5.0/reference/en-US/html/chapter-bean-constraints.html#chapter-bean-constraints, Accessed from Internet on Nov. 9, 2019, pp. 1-18.

*JSR 303 Validation, if One Field Equals "Something", Then These Other Fields Should Not Be Null*, Stack Overflow, Available Online at: https://stackoverflow.com/questions/9284450/jsr-303-validation-if-one-field-equals-something-then-these-other-fields-sho 7/10, Accessed from Internet on Nov. 9, 2019, 10 pages.

Andersen, *Unique Field Validation Using Hibernate and Spring*, #CodingExplained, Available Online at: https://codingexplained.com/coding/java/hibernate/unique-field-validation-using-hibernate-spring, Feb. 27, 2015, 19 pages.

Bekhta, Marko, *Bean Validation: Validation Based on Multiple Properties*, That Java Guy: The Wayback Machine, Available Online at: https://w eb.archive.org/web/20190628044600/http://that-java-guy.blogspot.com:80/2018/09/bean-validation-validation-based-on.html, Sep. 3, 2018, 18 pages.

Bernard et al., *JSR 303: Bean Validation*, Bean Validation Expert Group, Version 1.0.CR3 Proposed Final Draft 2, Jul. 8, 2009, 135 pages.

Braunlich, *Dynamic Validation with Spring Boot Validation*, codecentric AGBlog, Available Online at: https://blog.codecentric.de/en/2017/11/dynamic-validation-spring-boot-validation/, Nov. 22, 2017, 9 pages.

De Siqueira et al., *An Approach for Code Annotation Validation with Metadata Location Transparency*, Computational Science and Its Applications—ICCSA 2016, Jul. 1, 2016, pp. 422-438.

Froihofer et al., *Overview and Evaluation of Constraint Validation Approaches in Java*, Vienna University of Technology Institute of Information Systems, May 2007, 10 pages.

Gulden, Markus, *Method Constraints with Bean Validation 2.0*, Java EE, Available online at: https://www.baeldung.com/javax-validation-method-constraints, Nov. 23, 2018, pp. 1-20.

Morling, Gunnar, *Jakarta Bean Validation Specification*, Eclipse Foundation License, Version 2.0, Available Online at: https://beanvalidation.org/2.0/spec/, Aug. 5, 2019, 348 pages.

Sanjavi, Niamul, *Explore Annotations in Java 8*, DZone Java, Available Online at: https://dzone.com/articles/explore-annotations-in-java-8, Oct. 22, 2019, pp. 1-7.

Saxena et al., *FLAX: Systematic Discovery of Client-Side Validation Vulnerabilities in Rich Web Application*, In Proc. of the 17th Annual Netw ork and Distributed System Security Symposium (NDSS), Feb. 2010, 17 pages.

International Application No. PCT/US2021/014127, International Search Report and Written Opinion dated Apr. 26, 2021, 15 pages.

U.S. Appl. No. 16/809,025, Non-Final Office Action dated Jan. 22, 2021, 15 pages.

U.S. Appl. No. 16/809,025, Notice of Allowance dated May 5, 2021, 11 pages.

* cited by examiner

```
public class KeyValue {
    @NotBlank(message = "key is blank")
    private String key;

private String value;

public KeyValue(String key, String value) {
        this.key = key;
        this.value = value;
    } public String getKey() {
        return key;
    } public void setKey(String key) {
        this.key = key;
    } public String getValue() {
        return value;
    } public void setValue() {
        this.value = value;
    }

@Override
    public string tostring() {
        return "KeyValue{" + "key='" + key + '\'' + ", value='" + value + '\'' + '}';
    }
}
```

```
@Target({ElementType.FIELD, ElementType.METHOD, ElementType.TYPE})
@Retention(RetentionPolicy.RUNTIME)
@Constraint(validatedBy = MyConstraintValidator.class)
public @interface MyConstraint {
    String message() default "";
    Class<?>[] groups() default {};
    Class<? extends Payload>[] payload() default {};
    Integer myValue();
}
```
220

```
public class FutureLocalDateTimeValidator
        implements ConstraintValidator<MyConstraint, MyObject> {

@Override
    public void initialize(MyConstraint constraintAnnotation) {
        // initialization of the validator
    }

@Override
    public boolean isValid(MyObject value, ConstraintValidatorContext ctx) {
        // user defined validation code
        return true;
    }
}
```
222

```
public class Main { private static Validator VALIDATOR;

static {
        VALIDATOR = Validation.byDefaultProvider()
            .configure()
            .buildValidatorFactory()
            .getValidator();
    } public static main (String... args) {

KeyValue keyValue = new KeyValue("key", "value");
        validate(keyValue);
    } private static void validate (Object... toValidate) {
        Arrays.stream(toValidate)
            .forEach(object -> {
                System.out.println("\n" + object);
                Set<ConstraintViolation<Object>> constraints = VALIDATOR.validate(object);
                if (constraints.isEmpty()) {
                    System.out.println("No constraints were violated");
                } else {
                    System.out.println("Violated constraints: " + constraints);
                }
            })
    }
}
```

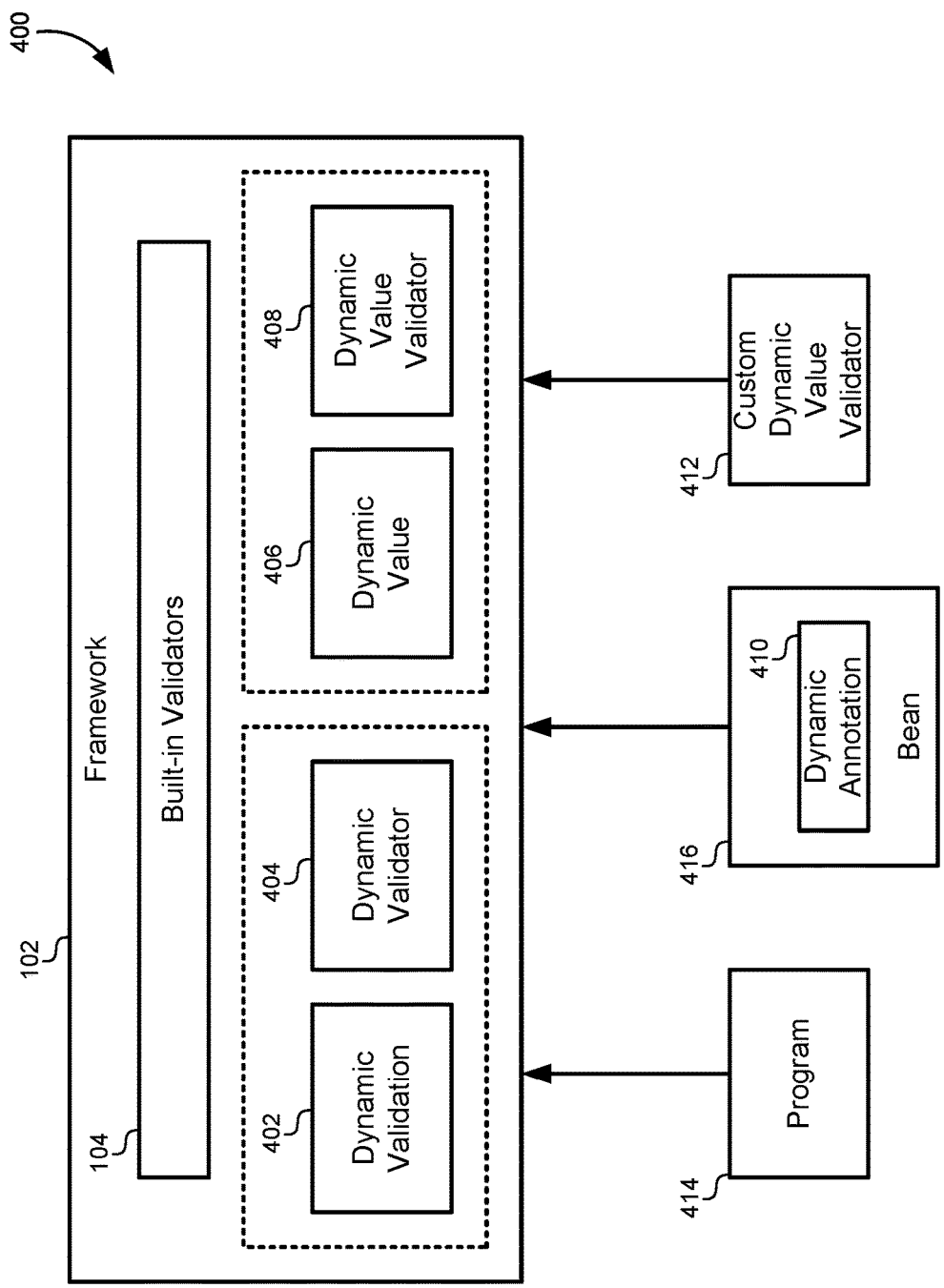

```
@DynamicValidation  ~410 public class KeyValue { private String key;

private String value;

public KeyValue(String key, String value) {
        this.key = key;
        this.value = value;
    } public String getKey() {
        return key;
    } public void setKey(String key) {
        this.key = key;
    }
    . . .
}
```

DynamicValue

```
@Documented
@Target(ElementType.TYPE)
@Retention(RetentionPolicy.RUNTIME)
@Repeatable(DynamicValues.class)
public @interface DynamicValue {
    String attributeName();  // 702
    String valuePattern();   // 704
}
```

DynamicValueValidator

```
public abstract class DynamicValueValidator<E> { private static Validator VALIDATOR;

static {
        VALIDATOR = Validation.byDefaultProvider()
            .configure()
            .buildValidatorFactory()
            .getValidator();
    } public abstract boolean isValid(E value, ConstraintValidatorContext ctx);

protected final boolean validateCustomConstraints(Object toValidate,
                                                       ConstraintValidatorContext ctx) {
        Set<ConstraintViolation<Object>> violations = VALIDATOR.validate(toValidate);
        if (!violations.isEmpty()) {
            useConstraint(violations.iterator().next().getMessageTemplate(), ctx);
            return false;
        }
        return true;
    } protected void useConstraint(String template,
                                  ConstraintValidatorContext ctx) {
        ctx.disableDefaultConstraintViolation();
        ctx.buildConstraintViolationWithTemplate(template).addConstraintViolation();
    }
}
```

FIG. 8

```java
public class DynamicValidator implements ConstraintValidator<DynamicValidation, Object> { private static Validator VALIDATOR;
    private static List<DynamicValueValidator> dynamicValidators;

static {
        VALIDATOR = Validation.byDefaultProvider()
            .configure()
            .buildValidatorFactory()
            .getValidator();
    } public DynamicValidator() {
        synchronized (DynamicValueValidator.class) {
            if (dynamicValidators == null) {
                Reflections reflections = Reflections(DynamicValidator.class.getClassLoader());
                Set<Class<? extends DynamicValueValidator>>allValidatorClasses =
                    reflections.getSubTypesOf(DynamicValueValidator.class);
                dynamicValidators = allValidatorClasses.stream()
                    .filter(c -> !c.isInterface() && !Modifier.isAbstract(c.getModifiers()))
                    .filter(c -> c.isAnnotationPresent(DynamicValue.class))
                    .filter(c -> Stream.of(c.getConstructors()).anyMatch(cnst ->
                                                    cnst.getParameterCount() == 0))
                    .map(c -> {
                        try {
                            return c.newInstance();
                        } catch (InstantiationException | IllegalAccessException e) {
                            return null;
                        }
                    })
                    .filter(Objects::nonNull)
                    .collect(Collectors.toList());
            }
        }
    }
}
```

FIG. 9A

```
@Override
public boolean isValid(Object o,
        ConstraintValidatorContext constraintValidatorContext) { if (!isStaticValid(o)) {
        return true;
    }

List<DynamicValueValidator> validators = dynamicValidators.stream()
        .filter(validator -> {
            try {
                validator.getClass().getMethod(
                    "isValid", o.getClass(), ConstraintValidatorContext.class);
                return true;
            } catch (NoSuchMethodException e) {
                return false;
            }
        })
        .filter(validator -> {
            DynamicValue[] dynamicValues =
                validator.getClass().getAnnotationsByType(DynamicValue.class);
            return Arrays.stream(dynamicValues).allMatch(dynamicValue ->
                matchDynamicAnnotation(dynamicValue, o));
        })
        .collect(Collectors.toList());

for (DynamicValueValidator validator: validators) {
        if (!validator.isValid(o, constraintValidatorContext)) {
            return false;
        }
    }
    return true;
}
```

FIG. 9B

```
private boolean isStaticValid(Object o) {                                    ─ 920
    Set<String> propertyNames = new HashSet<>();
    Class<?> clazz = o.getClass();
    while (clazz != null) {
        propertyNames.addAll(Arrays.stream(clazz.getDeclaredFields())
                .map(Field::getName)
                .collect(Collectors.toSet())
        );
        clazz = clazz.getSuperclass();
    }
    return propertyNames.stream().allMatch(p -> VALIDATOR.validateProperty(o, p).isEmpty());
} private boolean matchDynamicAnnotation(DynamicValue dynamicValue, Object o) {    ─ 922
    Class<?> clazz = o.getClass();
    while (clazz != null) {
        try {
            Field f = clazz.getDeclaredField(dynamicValue.attributeName());
            f.setAccessible(true);
            Object propertyValue = f.get(o);
            return propertyValue != null
                && propertyValue.toString().matches(dynamicValue.valuePattern());
        } catch (NoSuchFieldException ignored) {
        } catch (IllegalAccessException e) {
            return false;
        }
        clazz = clazz.getSuperclass();
    }
    return false;
}
```

Custom Dynamic Value Validator

```
@DynamicValue(attributeName = "key", valuePattern = ".*phone\\.number.*")
public class PhoneNumberValidator extends DynamicValueValidator<KeyValue> { public boolean isValid(KeyValue value,
                           ConstraintValidatorContext ctx) {
        PhoneNumber number = new PhoneNumber(value.getValue());
        return validateCustomConstraints(number, ctx);
    } private static class PhoneNumber {

@Pattern(regexp = "^[+]?[0-9]{1,15}$", message = "value.phone.number")
        private String value;

PhoneNumber(String value) {
            this.value = value;
        } public String getValue() {
            return value;
        }
    }
}
```

FIG. 10A

Custom Dynamic Value Validator

```
@DynamicValue(attributeName = "key1", valuePattern = ".*phone\\.number.*")
@DynamicValue(attributeName = "key2", valuePattern = "CZ")
public class PhoneNumberValidator extends DynamicValueValidator<TwoKeyValue> {
    public boolean isValid(TwoKeyValue value,
            ConstraintValidatorContext ctx) {
        PhoneNumber number = new PhoneNumber(value.getValue());
        return validateCustomConstraints(number, ctx);
    } private static class PhoneNumber {
        @Pattern(regexp = "^[+]?[0-9]{1,15}$", message = "value.phone.number")
        private String value;

PhoneNumber(String value) {
            this.value = value;
        } public String getValue() {
            return value;
        }
    }
}
```

FIG. 10B

```
public class Main { private static Validator VALIDATOR;

static {
        VALIDATOR = Validation.byDefaultProvider()
            .configure()
            .buildValidatorFactory()
            .getValidator();
    } public static main (String... args) {
        KeyValue keyValue = new KeyValue("phone", "+420670780470");
        validate(keyValue);
        ....
    }
}
```

FIG. 11

DYNAMIC VALIDATION FRAMEWORK EXTENSION

CROSS-REFERENCE TO RELATED APPLICATIONS

This application is a continuation of U.S. patent application Ser. No. 16/809,025, filed Mar. 4, 2020, entitled "DYNAMIC VALIDATION FRAMEWORK EXTENSION," which is hereby incorporated by reference in its entirety.

BACKGROUND

Programming languages have recently provided advanced mechanisms for enforcing constraints on member variables, classes, and functions. Constraints may be used to validate different data fields to ensure that they meet some one or more predefined requirements. Traditionally, constraints have been enforced using customized error-checking code that was included throughout the software. However, modern programming languages have begun providing mechanisms for validating data against sets of constraints as part of the programming language framework. Instead of rewriting the constraints and validation code for each project and each data set, programmers can instead use the constraint-enforcement mechanisms of the programming language framework to improve the efficiency of software development and the consistency with which common datatypes may be validated.

For example, the JAVA programming language provides validation for constraints imposed on class modules or "beans." Bean validation is defined in the JSR 380 specification, which allows for static validation on JAVA beans. In static validation, an attribute (e.g., a member variable) inside the bean meets some predefined criteria, such as being non-null, non-empty, within a specified numeric range, and so forth. If these predefined criteria are not met, the framework reports a constraint violation. The validation framework also allows users to create user-defined constraints and user-defined validators. These allow users to customize various validation routines to match a desired data format.

BRIEF SUMMARY

Modern programming language frameworks provide constructs that perform static validation on runtime values using predefined constraints. When runtime instances are created, the runtime values stored in variables and/or member attributes may be provided to a validator function that ensures that the value conforms to the predefined constraint. Predefined constraints may include numerical ranges, acceptable string patterns, date ranges, specific formatting, and/or other requirements that may be enforced on a data value. To activate a constraint, the variable or member attribute may be annotated with a text string that refers to a specific validator function. Thus, the validator function to be used for a specific variable is set at programming-time, not at runtime.

The embodiments described herein enhance programming language frameworks to provide for dynamic validation. Dynamic validation allows the validator function for any variable to be selected at runtime rather than statically declared at programming-time. Instead of annotating a variable with an annotation that refers to a specific validator function or constraint type, programmers can annotate a variable with an annotation that indicates that the validator function will be selected dynamically at runtime. When a runtime instance of the variable is created, the programming language framework may identify the dynamic validation annotation on the variable, and then use the runtime values in the variable to determine which validator function(s) should be used.

The programming language framework may be modified to include additional annotation definitions. One annotation definition may be used to annotate variables that should be subject to dynamic validation as described above. Another annotation definition may be used to annotate the user-defined dynamic value validator functions themselves. The second annotation may receive names and/or values for attributes to be dynamically validated. For example, a class definition may include two member attributes that operate as a key-value pair (e.g., string key, string value). The second annotation may reference the "key" attribute and determine whether the value in the "key" attribute indicates that this key-value pair stores a phone number (e.g., key="phone"; value="571-555-1534"). The annotation used on the validator function can specify that it should be used when an attribute named "key" has a value of "phone," and the code inside the validator function can then validate the "value" attribute to determine whether it stores a properly formatted phone number. If the "key" value stores something different, such as "date" or "time," then this this validator would not be executed on this class instance. This decision is made at runtime by the framework.

When the programming language framework receives a variable at runtime annotated for dynamic validation, the framework may first execute any traditional static validations. If a static validation fails, then no dynamic validation may be necessary. After static validations are complete, the programming language framework may generate a list of all dynamic validator functions available in a class path or program directory. The list of available dynamic validators may include any custom dynamic value validator functions that have been defined by programmers. The framework may then cycle through the list of available dynamic value validator functions and identify any for which the runtime values of the annotated variable satisfy the annotated constraints on the dynamic value validator function. Continuing with the example above, the framework may identify the phone number value validator function in the class path and compare the attributeName="key" and attributeValue="phone" constraint in the function annotation to the runtime values of the variable. Any identified validator functions may then be executed on the runtime values. In some embodiments, the framework may provide an abstract base class that includes protected helper functions for executing dynamic validations, and this abstract base class may be overridden in the custom dynamic value validators written by the programmer.

These programming language framework enhancements allow a programmer to encapsulate different dependencies between member attributes in different validator functions that are selected dynamically at runtime. When only static validation is used, a validator function was required to include branches of if/then statements that compare different possible values. These statements are difficult to maintain over time as code evolves. However, when using dynamic validation, each variable dependency for validation can be handled separately and independently, and new dependencies can be easily added without limitation by annotating a new validator function with the added dependency.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 2A illustrates an example of a bean that uses a built-in constraint annotation, according to some embodiments.

FIG. 2B illustrates definitions for a custom validator/constraint.

FIG. 3 illustrates a program that validates the constraints in the bean, according to some embodiments.

FIG. 4 illustrates a diagram of a framework extension for dynamic validation, according to some embodiments.

FIG. 6 illustrates an example of a bean that uses dynamic validation, according to some embodiments.

FIG. 7 illustrates a new annotation added to the framework that defines relationships between dynamic values, according to some embodiments.

FIG. 8 illustrates an example of an abstract class for a DynamicValueValidator, according to some embodiments.

FIG. 9A illustrates a definition for a DynamicValidator class, according to some embodiments.

FIG. 9B illustrates an isValid( ) function for the DynamicValidator, according to some embodiments.

FIG. 9C illustrates methods for the DynamicValidator to perform static validation and matching between metadata defined in the DynamicValue annotation and the corresponding bean, according to some embodiments.

FIG. 10A illustrates an example of a user-defined custom dynamic value validator for dynamic validation, according to some embodiments.

FIG. 10B illustrates an example of a custom dynamic value validator with multiple constraint annotations, according to some embodiments.

FIG. 11 illustrates an example of a program where dynamic validation may be invoked, according to some embodiments.

DETAILED DESCRIPTION

In the JAVA programming language, various standards (JSR 380, JSR 349, JSR 303, etc.) describe a framework that may be used for the validation of attributes within JAVA beans. Bean validation is commonly used when data flows from a presentation layer to a persistence layer. Before this framework, users typically had to duplicate their validation code in each layer of their application. The validation framework allows users to perform a validation using a single mechanism via metadata that is added to domains or classes. The metadata may include constraints that are added via XML, descriptors. For example, the default metadata source for a JAVA class may include a JAVA annotation that is added to a target. The target data may then be validated against the constraint referenced by the annotation at runtime.

A constraint generally is comprised of two separate parts. A first part of the constraint includes a constraint annotation, which includes an annotation that may be added to the code to identify a runtime constraint. Generic constraint annotations may target a field, a method, a constructor, a parameter, a type, and so forth. A second part of the constraint may include a collection of validators that implement the constraint. For example, a constraint may include an allowable numeric range for a member variable, and a validator may include an isValid( ) function comprising code that determines whether the runtime value of the member variable falls within the allowable numeric range. Thus, a constraint annotation and a validator for that constraint annotation work together to perform runtime validation of constraints on program data.

Figure 1:
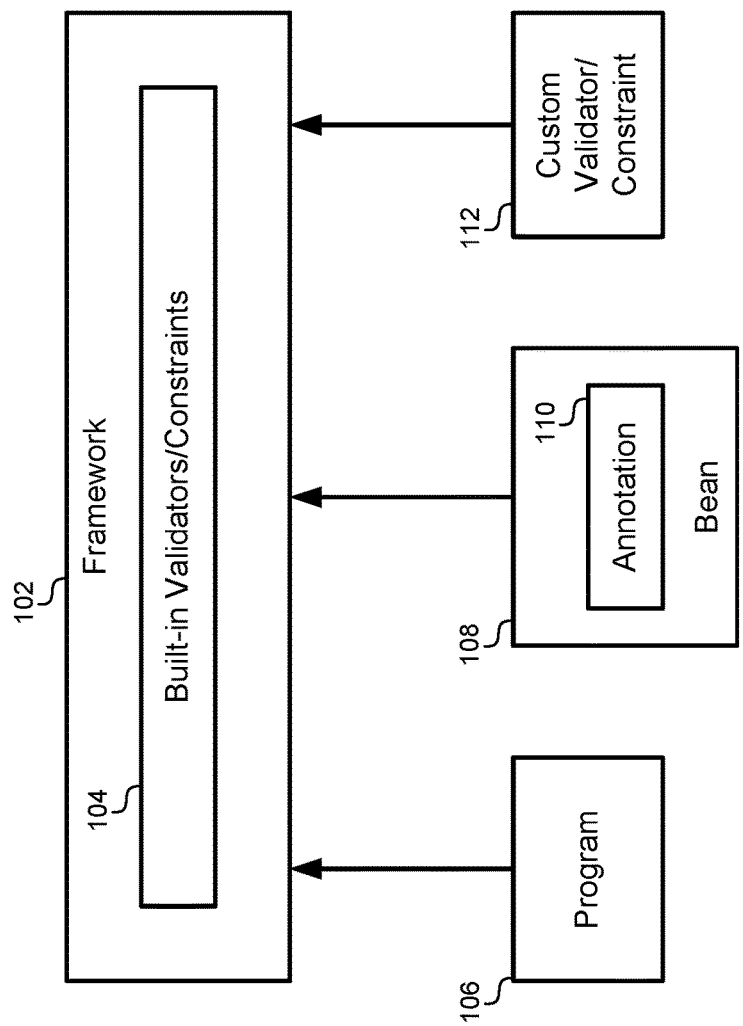
FIG. 1 illustrates a diagram of a constraint validation framework for a programming language, according to some embodiments.

FIG. 1 illustrates a diagram 100 of a constraint validation framework 102 for a programming language, according to some embodiments. In computer programming, a software framework is an abstraction in which software providing generic functionality can be augmented by user code. The framework 102 generally provides a standardized library and methods to build and deploy applications, and it may provide functionality that is part of a larger software platform to facilitate the development of software applications. For example, the framework 102 may include support programs, compilers, code libraries, toolsets, application programming interfaces (APIs), and other components or development environments. For example, the JAVA programming language may be combined with various frameworks that provide utilities, programming language features, and code libraries that can be used to implement constraint validation. As used herein, the framework 102 itself may be distinguished from user code or custom, user-defined validators and constraint annotations.

A user program 106 may include user code that is compiled, assembled, interpreted, and/or executed as a software application. For example, the program 106 may include a main( ) function that instantiates class objects, executes functions, stores variables, and/or otherwise implements various aspects of a software application. The program 106 may be considered user code, and may be distinguished from the framework 102. Additionally, the user code may include one or more custom class/object definitions. In the JAVA programming language, these classes may be organized in packages referred to as "beans." The program 106 may instantiate runtime objects using the class definitions in a bean 108.

As is common in many class definitions, classes within the bean 108 may include member variables, member functions, and other data. A constraint annotation 110 may be added in various locations to the class definitions in the bean 108. The scope of the annotation 110 may vary based on the location of the annotation 110 and/or the definition of the corresponding constraint annotation definition. As will be described in the examples below, the annotation 110 typically includes a line of code that identifies the constraint and may provide values for the constraint, such as messages and/or other information that may be used when validating the constraint.

In order to validate the constraint, a validator may be executed by the program 106. In some cases, the framework 102 may include one or more built-in validators 104. The built-in validators may include code that validates a set of built-in constraint definitions. For example, some JAVA frameworks may include built-in support for simple constraints. The javax.validation.constraints package includes built-in constraints, such as constraints that enforce minimum/maximum values, enforce null/non-null values, enforce predefined regular expression patterns, enforce predetermined sizes, and so forth. The bean 108 may utilize these built-in validators/constraints 104 by simply adding the corresponding annotation 110 to the code of the bean 108.

In addition to using the built-in validators/constraints 104, the program 106 may also use custom a validator/constraint 112. To use a custom validator and/or a custom constraint, a user-defined validator definition and/or constraint definition may be provided to the program 106. The custom validator/constraint 112 may each implement predefined interfaces and/or abstract classes provided by the framework 102 such that the custom validator/constraint 112 can be executed by the framework 102 the same way that the built-in validators/constraints 104 are used at runtime.

FIG. 2A illustrates an example of a bean 108 that uses a built-in constraint annotation 110, according to some embodiments. This bean includes a definition of a public class that encapsulates a key-value data structure. Many modern data structures use this paradigm for storing many different datatypes in a unified format. A generic format may use a key-value structure where data is stored as a key-value pair. The key portion of the pair may be used to describe a data type (or any other type of metadata) for the value portion of the pair. For example, the key portion of the pair may define a data type, such as a phone number, an address, a username, etc. While the corresponding value portion of the pair may include a specific phone number, a specific address, a specific user's name, etc. This flexible system allows any type of data to be stored, so long as the key defines the data type and the value defines the data value. This KeyValue class may be used herein as an example of a bean that may use dynamic validation as described below. However, this class is used only by way of example it is not meant to be limiting. Dynamic validation may be used with any data structure, including classes and other encapsulations of data.

The bean 108 may include private member variables for both the key and the value. The example of FIG. 2A includes a constraint annotation 110 that may be used for validating the value of the string. Some of the built-in constraints in some JAVA frameworks may include the @NotBlank constraint, which indicates that the string value in the key variable should not be blank. The annotation 110 includes a parameter that sets the message accompanying a constraint violation to a specified value, such as "key is blank." Instead of writing custom validation code, the user can simply include the constraint annotation 110 to enforce predefined constraints that can be automatically validated by functions in the framework without writing additional code.

In addition to using built-in constraints, programming language frameworks may also allow users to define their own custom constraint annotations and custom validators for validating those constraints. FIG. 2B illustrates definitions for a custom validator/constraint 112. First, an example of a constraint definition 220 is provided that allows users to define their own constraint annotations. The constraint definition 220 may specify a target upon which the constraint may be applied (e.g., a field, a method, a type, etc.). The constraint definition 220 may also include message, group, and/or payload fields. Other fields may be added to provide information or other settings that may enhance validation. For example, the message field may be used to create an error message, which may be overwritten by a parameter as illustrated in FIG. 2A. Group fields may define groups to which the constraint belongs. The payload field may specify other data with which the constraint may be associated. For example, the payload may be used to associate a severity with the constraint.

Along with the constraint definition 220, a validator definition 222 is also provided to specifically validate the constraint of the constraint annotation definition 220. The validator definition 222 in the context of the JAVA programming language may implement the ConstraintValidator interface, and may override two public functions. The initialize( ) function may be used to receive data from the constraint annotation and initialize the validator. The isValid( ) function holds the code that is used to validate the corresponding constraint against the corresponding object. If an annotation for the constraint definition 220 is used on a target object that corresponds to the object type in the validator definition 222, then the constraint may be validated. In some cases, the validator definition 222 may be defined generically such that the target class is of the Object type. In this case, the framework invokes the user-defined validation code for all targets annotated with the constraint. For example, the validator definition 222 may validate all targets bean annotated with the @MyConstraint constraint having a type of MyObject. Note that the validator definition 222 cannot be selected based on runtime values of attributes with in the object.

FIG. 3 illustrates a program 106 that validates the constraints in the bean 108, according to some embodiments. First, the program 106 instantiates a validator 302 of a default type. The program 106 then defines a validate( ) function 308 that performs a validation on a specified list of objects in a parameter list. The main( ) function of the program 106 then instantiates a new KeyValue object with specified strings for the key and the value attributes. This instantiated object is then passed as a parameter 306 to the validate function. The validate function 308 then executes the specified validator on the object and reports any constraint violations.

Although users may define custom validators and constraints in existing programming language frameworks, the embodiments described herein improve on existing programming language frameworks to provide mechanisms for validating dependencies between attributes through the framework based on runtime values. These improvements allow custom validators and constraints to be readily implemented to provide deep validation where a value for one attribute can influence the type of constraint that is validated on another attribute. For example, if the value for the key in a KeyValue object includes the string value of "phone," then the user may wish to validate the string in the value attribute to ensure that it is a properly formatted phone number. In another example, if the key is "date," then the user may wish to validate the value to ensure that the string is a properly formatted date. This cannot be performed with a static validation because only a single value of the target is validated. And while the user can validate relationships by defining their own constraints and providing validation code, the user would need to define a new combination of constraint and validator for each relationship in the target. This code is very hard to maintain and very hard to parse.

The embodiments described herein instead describe an extension to a validation framework that solves this problem in a generic way rather than requiring specific code for each relationship.

FIG. 4 illustrates a diagram 400 of a framework extension for dynamic validation, according to some embodiments. This diagram 400 is similar to the diagram 100 of FIG. 1, except that the framework 102 has been extended to include a number of additional modules: a dynamic validation 402 annotation, a dynamic validator 404, a dynamic value annotation 406, and a dynamic value validator 408. Each of these modules will be described in greater detail below. In short, these modules allow the framework to handle a @DynamicValidation annotation to then dynamically validate different relationships between different data fields based on runtime values, such as relationships between keys and values in the KeyValue class described above. It should be noted that these modules are part of the programming language framework and are not user-defined classes that the user is required to write. These are modules that may be deployed with the framework 102, and may thus be distinguished from code that a user may write to interact with the framework 102.

In this example, a bean 416 may include a dynamic annotation 410, such as the @DynamicValidation annotation described in detail below. When a program 414 creates an instance of an object defined in the bean 416, the dynamic annotation 410 will instruct the framework 102 to perform a dynamic validation using a custom dynamic value validator 412 defined by the user. As described below, the custom dynamic value validator 412 may extend abstract base classes made available in the extension to the framework 102, thus minimizing the code that a user may be required to write.

Figure 5:
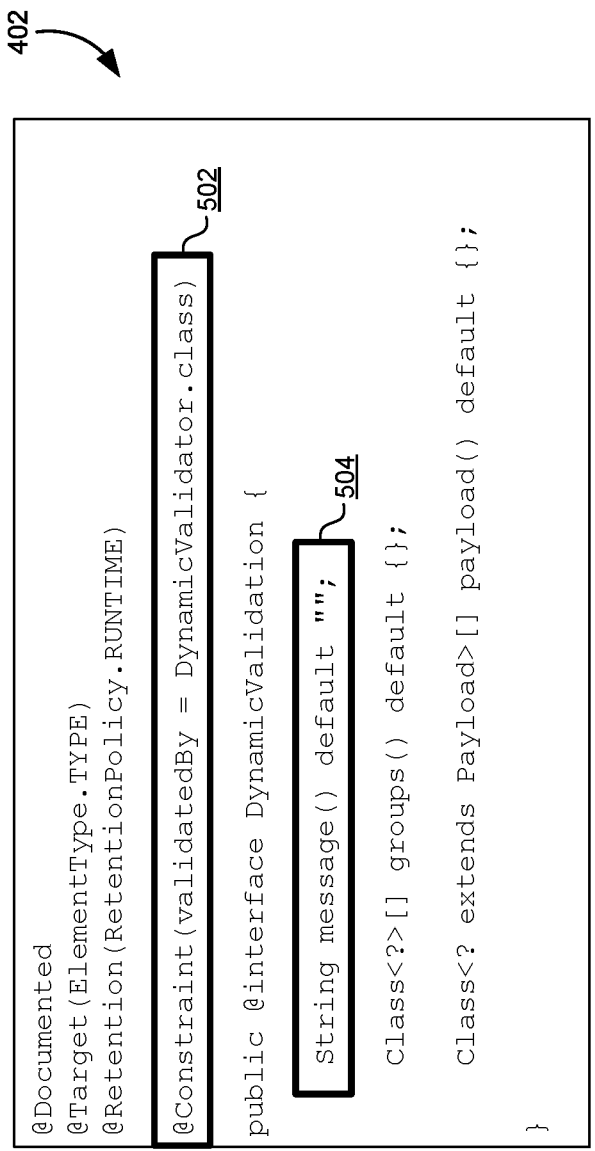
FIG. 5 illustrates a dynamic validation constraint annotation, according to some embodiments.

FIG. 5 illustrates a dynamic validation constraint annotation, according to some embodiments. The starting point for dynamic validation is the definition of the constraint annotation and its corresponding validator. The dynamic validation constraint definition 402 defines the annotation that may be added to a class to indicate to the framework that dynamic validation should be executed rather than a traditional validation. Since the dynamic validation may be used to evaluate relationships between different member variables of a class, the constraint definition 402 sets the target value to be TYPE, which allows access to all of the attributes within the object definition. The name given for this constraint definition 402 is DynamicValidation (which corresponds to the @DynamicValidation annotation). However, this name is used only by way of example and is not meant to be limiting. Any other name may be used for the dynamic validation constraint definition 402. In some embodiments, no default message 502 needs to be defined with the annotation. As described below, any message defined within this annotation may be omitted and replaced during validation by the validator. Also note that the definition 502 specifies that this constraint may be validated by the DynamicValidator class, the name of which is also used only by way of example, and the function of which is described in detail below.

FIG. 6 illustrates an example of a bean 416 that uses dynamic validation, according to some embodiments. Using the definition described above in FIG. 5, the KeyValue class may be annotated with the @DynamicValidation constraint annotation. This allows the framework to invoke a validator that dynamically evaluates the relationship between the runtime values of the key and value member attributes. Note that because the target value for the dynamic validation constraint definition 402 is TYPE, the dynamic annotation 410 may be applied at the class level rather than at the individual member variable levels. This dynamic annotation 410 based on the dynamic validation constraint definition 402 may be added at a similar location of any bean where dynamic validation should be invoked.

FIG. 7 illustrates a new annotation added to the framework that defines relationships between dynamic values, according to some embodiments. As described in detail below, this annotation may be used for custom dynamic value validators to indicate runtime attribute values that may cause the validator to be invoked. Specifically, FIG. 7 illustrates a dynamic value annotation definition 406 that defines relationships between values. This particular annotation includes two methods: attributeName and valuePattern. The attributeName method returns a name of an attribute for which the value will be checked in the target bean. The valuePattern method returns a regular expression for checking the value. This annotation may be used on instances of the DynamicValueValidator described in detail below. This extension ensures that only beans satisfying the relationship definition defined in the @DynamicValue need to be further validated. Additionally, this annotation may be used on the target DynamicValueValidator instances multiple times to allow the user to define multiple relationships. For example, if there are more @DynamicValue annotations for the DynamicValueValidator, each of these relationships defined by the annotations can be further validated.

FIG. 8 illustrates an example of an abstract class for a DynamicValueValidator, according to some embodiments. First, note that the DynamicValueValidator class is an abstract class, which means that any custom dynamic value validator classes defined by the user should extend the DynamicValueValidator 408, and the extension should be annotated with at least one @DynamicValue as described above. This abstract class may be patterned after the javax.validation.ConstraintValidator abstract class in some JAVA frameworks that is extended by regular user-defined validators.

Each validator that extends the DynamicValueValidator class should provide an implementation of the isValid( ) method 802. This method may be called by the extended class if the relationship defined in the @DynamicValue is met for the validated bean. Specifically, the code for providing the actual validation may be provided in the custom dynamic value validator in an isValid( ) function that overrides this abstract function in the abstract base class.

Additionally, the DynamicValueValidator 408 includes two protected methods: validateCustomConstraints( ) 804 and useConstraint( ) 806, which may be used to facilitate user-defined validators. The validateCustomConstraints( ) method 804 may be used in a user-created validator if it defines its own object to be statically validated. One of the core concepts behind validation is that the validator defines its own inner class having attributes annotated with constraints. Then, these attributes are populated with data from the bean being validated. The instance of the class is then passed to the validateCustomConstraints( ) method 804. If this method 804 identifies any constraint violation in the validated object, it takes the first message from the violation, passes it to the ConstraintValidationContext, and returns false. The helper method, useConstraint( ) 806, may be used to provide a user-defined message if the user specifies a deep validation of the bean that fails (e.g., the user validates whether a connection to a provided URL can be opened). Both of these functions may be called by the custom dynamic value validator written by the user that extends this class. As part of the framework extension, these functions reduce the amount of code required to write custom dynamic value validators.

FIG. 9A illustrates a definition for a DynamicValidator 404 class, according to some embodiments. The DynamicValidator implements the ConstraintValidator template that is already defined in the framework. Importantly, the DynamicValidator 404 serves as an entry point to the framework extension added by the embodiments described herein for performing dynamic validation. This class first creates a validator for checking statically defined constraints, creates a list of dynamic validators that are loaded from a class path scan, and creates a static instance of a VALIDATOR. It should be noted that the DynamicValidator may be used for beans of any type. When the instance of the ConstraintValidator is created, it loads all classes extending the DynamicValueValidator described above. A constructor 902 creates an instance of a DynamicValidator according to the code in FIG. 9A. Specifically, if any of the dynamic validators in the class path are not yet instantiated, they are synchronously loaded and instantiated. As shown in FIG. 9A, the code filters out any abstract classes, any classes without no-argument constructors, and classes that do not have at least one correct @DynamicValidation annotation. Next, each of these classes are instantiated and cached. Some embodiments may use a full class path scan, while other embodiments may use Contexts and Dependency Injection (CDI) to obtain all instances of the DynamicValueValidator having the @DynamicValidation annotation. If CDI is used, then user-defined dynamic bean validators should define their scope to be visible for the CDI lookup. This approach may be preferable in JAVA EE environments.

FIG. 9B illustrates an isValid( ) 910 function for the DynamicValidator, according to some embodiments. As soon as the isValid( ) method 910 is invoked in the DynamicValidator 404, it may perform a validation of any statically defined constraints within the bean (912). If any static constraint is violated, no dynamic validation may be necessary, and thus the isValid( ) method may return and exit. Statically defined constraints may have a higher priority than dynamically defined constraints in some embodiments. Alternatively, if there are no constraint violations on statically defined constraints, then dynamic validation may begin. The list of dynamic validators populated above in the constructor 902 may be filtered to find validators that are defined for this particular type of bean, and for which the relationship defined in the @DynamicValue is satisfied (914). Note that if the attribute does not have the type String, the toString( ) method may be called to retrieve a string representation of the attribute. Finally, any validator satisfying these conditions may then be passed to their respective isValid( ) methods (916).

FIG. 9C illustrates methods for the DynamicValidator to perform static validation and matching between metadata defined in the DynamicValue annotation and the corresponding bean, according to some embodiments. The isStaticValid( ) function 920 may perform validation on all properties found in the current class, as well as recursively in any parent classes. This private function 920 is called above in FIG. 9B to first determine whether any static validations fail before performing any dynamic validations. The matchDynamicAnnotation( ) function 922 may perform matching between metadata defined in the DynamicValue annotation and the bean. This private member function may return true if data defined in the annotation matches data found in the bean. This function 922 is called above in FIG. 9B when filtering dynamic validators that do not have the specified relationship condition.

FIGS. 7-9C illustrate implementations of various modules that may be included in a framework extension for performing dynamic validation, according to some embodiments. These example modules may use the JAVA programming language and specific JAVA constructs as an example to provide an enabling disclosure. However, these examples are not meant to be limiting. The principles for extending a framework to provide dynamic validation may be applied to any programming language, and may have different implementations other than those specifically used by way of example in these figures.

FIG. 10A illustrates an example of a user-defined custom dynamic value validator 412 for dynamic validation, according to some embodiments. The custom dynamic value validator 412 may be the only code that needs to be written by a user to employ dynamic validation. First, the validator 412 should include instances of one or more @DynamicValue annotations 1002. The validator 412 should also extend 1004 the DynamicValueValidator abstract class described above in FIG. 8. This extended class provides an implementation for the abstract isValid( ) function 1006 from the parent class. Some embodiments may also provide private helper functions to perform the validation.

The dynamic @DynamicValue annotation 1002 specifies the variable and value for that variable that will trigger this dynamic validation. In this example, dynamic validation will be triggered when the target object includes a variable with the attribute name "key," and where the value of that attribute includes a string with the "phone number" text depicted in the annotation 1002. The validator 412 extends 1004 the DynamicValueValidator abstract parent class specifically for objects of the type KeyValue described above in FIG. 2A and FIG. 6. The isValid( ) receives a target KeyValue object, then uses the private PhoneNumber class to validate the phone number. At this point, the value variable in the KeyValue target object is expected to have a valid phone number to be validated because the key variable dynamically indicated such. Note that if the value of the attribute in the KeyValue object did not match the value in the annotation of the custom dynamic value validator 412, then the validator would not be executed on the instance of the object.

FIG. 10B illustrates an example of a custom dynamic value validator with multiple constraint annotations, according to some embodiments. Although the example in FIG. 10A only uses a single @DynamicValue annotation, other implementations may use a plurality of @DynamicValue annotations. For example, the KeyValue class described above includes a single key in a single value. Other embodiments include a TwoKeyValue class that includes two keys and a single value. The first key (key1) may still be used to specify that the value is a phone number, while the second key (key2) may be used to specify a country code. Because each country may have different formats for their phone numbers, both keys may be included individually in the @DynamicValue annotations 1010 in order for this particular custom dynamic value validator 412 to be invoked. This validator 412 may operate the same as the validator in FIG. 10A, except the class may be extended 1012 using the TwoKeyValue class rather than the KeyValue class. Similarly, the isValid( ) function 1014 may receive a TwoKeyValue object rather than a KeyValue object.

FIG. 11 illustrates an example of a program 414 where dynamic validation may be invoked, according to some embodiments. As described above in relation to FIG. 6, the KeyValue class has been annotated with the @DynamicValidation constraint. When a new instance 1104 of the KeyValue class is created, string values may be provided for the key and value attributes. In this example, the key is set to be "phone", which will qualify for the custom dynamic value validator 412 in FIG. 10. The validate( ) function may then be called to dynamically check the value of the key ("phone") and invoke the custom dynamic value validator 412 to ensure that the phone number provided in the value attribute is of the proper format.

Figure 12:
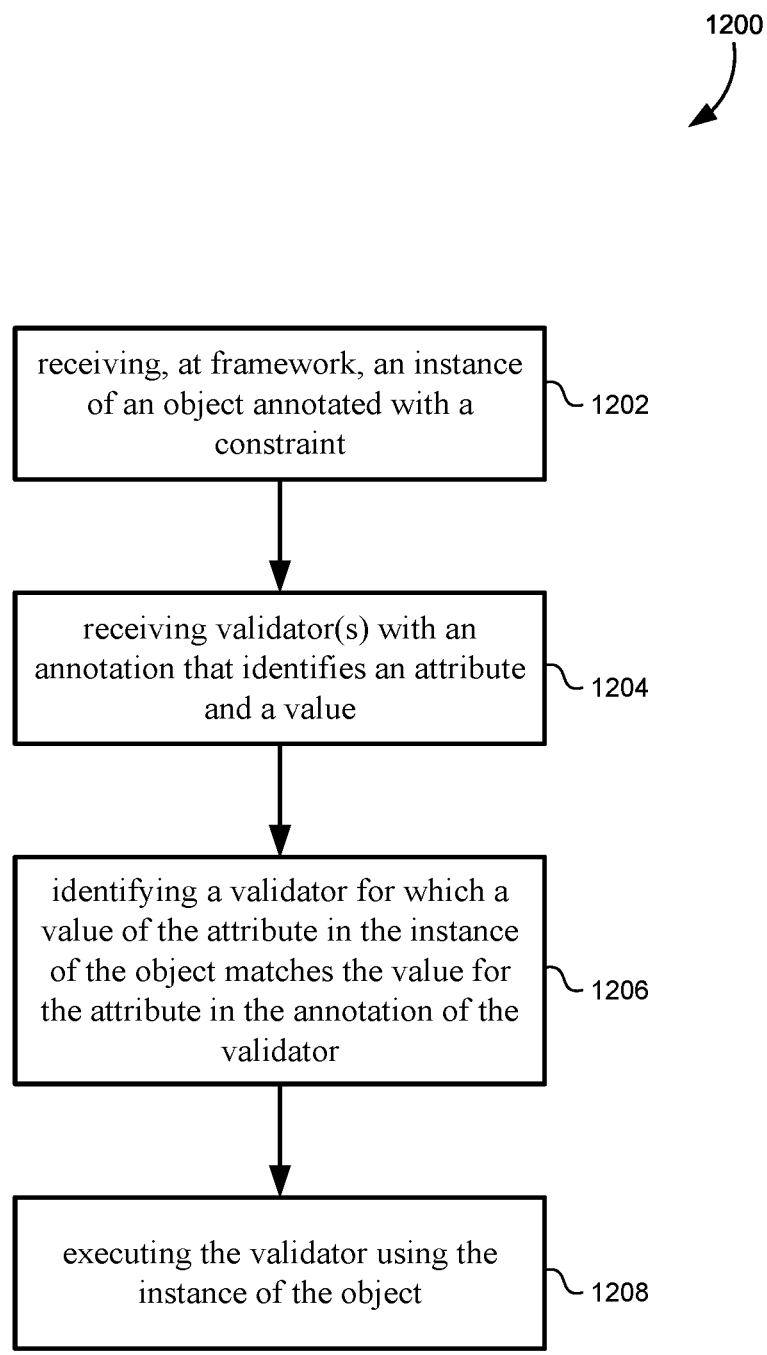
FIG. 12 illustrates a flowchart of a method for dynamically validating variable dependencies at runtime, according to some embodiments.

FIG. 12 illustrates a flowchart 1200 of a method for dynamically validating variable dependencies at runtime, according to some embodiments. The method may include receiving, at a programming language framework, an instance of an object (1202). The instance of the object may be instantiated from an object definition. For example, a class object may be instantiated based on a class definition file. The class definition may be part of a bean or other software module. The definition of the object, such as the class definition, may be annotated with a constraint. The constraint may indicate that instances of the object should be subject to dynamic validation rather than static validation or other forms of custom, user-defined validation routines. Dynamic validation may imply that a type of validation routine and constraints that are applied to the instance of the object depend on variable runtime values in the object instance. For example, the @DynamicValidation constraint annotation may be used on a class definition as illustrated in FIG. 6. An instance of the object (e.g., the KeyValue object) may be instantiated and passed to the framework as part of a validate function as illustrated in FIG. 3.

The method may also include receiving one or more validators that are annotated with an annotation that identifies an attribute in the definition of the object, and a value for the attribute (1204). For example, the custom dynamic value validators in FIG. 10A and FIG. 10B may be annotated using the @DynamicValue annotation from FIG. 7. The annotation may include an attribute name that identifies the attribute in the definition of the object, along with a corresponding value for the attribute. For example, the attribute may be identified by an attribute name, such as "key," and the value may include a value string, such as "phone number" as used in the examples above. The validator may be received by the framework as it extends an abstract base class. The validator may also implement a Boolean function that returns an indication of whether the value passed the constraint (e.g., an isValid( ) function). The validator may include user-defined code that implements a constraint, such as a format, minimum, maximum, range, and/or any other variable constraint.

The method may additionally include identifying a validator in the one or more validators for which a value of the attribute in the instance of the object matches the value of the attribute in the annotation of the validator (1206). For example, the DynamicValidator class in FIG. 9A may identify all of the validators in a runtime path or otherwise associated with a program. The constructor for the DynamicValidator may then cycle through each of the available validators and identify validators for which the annotation (e.g., the DynamicValue parameters) match the value for the corresponding attribute in the object instance. In some embodiments, each validator may have more than one (i.e., a plurality of) DynamicValue annotations, each of which may be satisfied to execute the validator on the object instance.

The method may further include executing the validator using the instance of the object (1208). The identified validator, along with any other validators that match the annotation criteria, may be executed on the instance of the object. For example, an attribute value may be validated against a constraint, and the constraint may be selected based on the value of another attribute, thus allowing attribute dependencies to influence which validators are executed and the results of those validators.

It should be appreciated that the specific steps illustrated in FIG. 12 provide particular methods of performing a dynamic validation according to various embodiments. Other sequences of steps may also be performed according to alternative embodiments. For example, alternative embodiments may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 13:
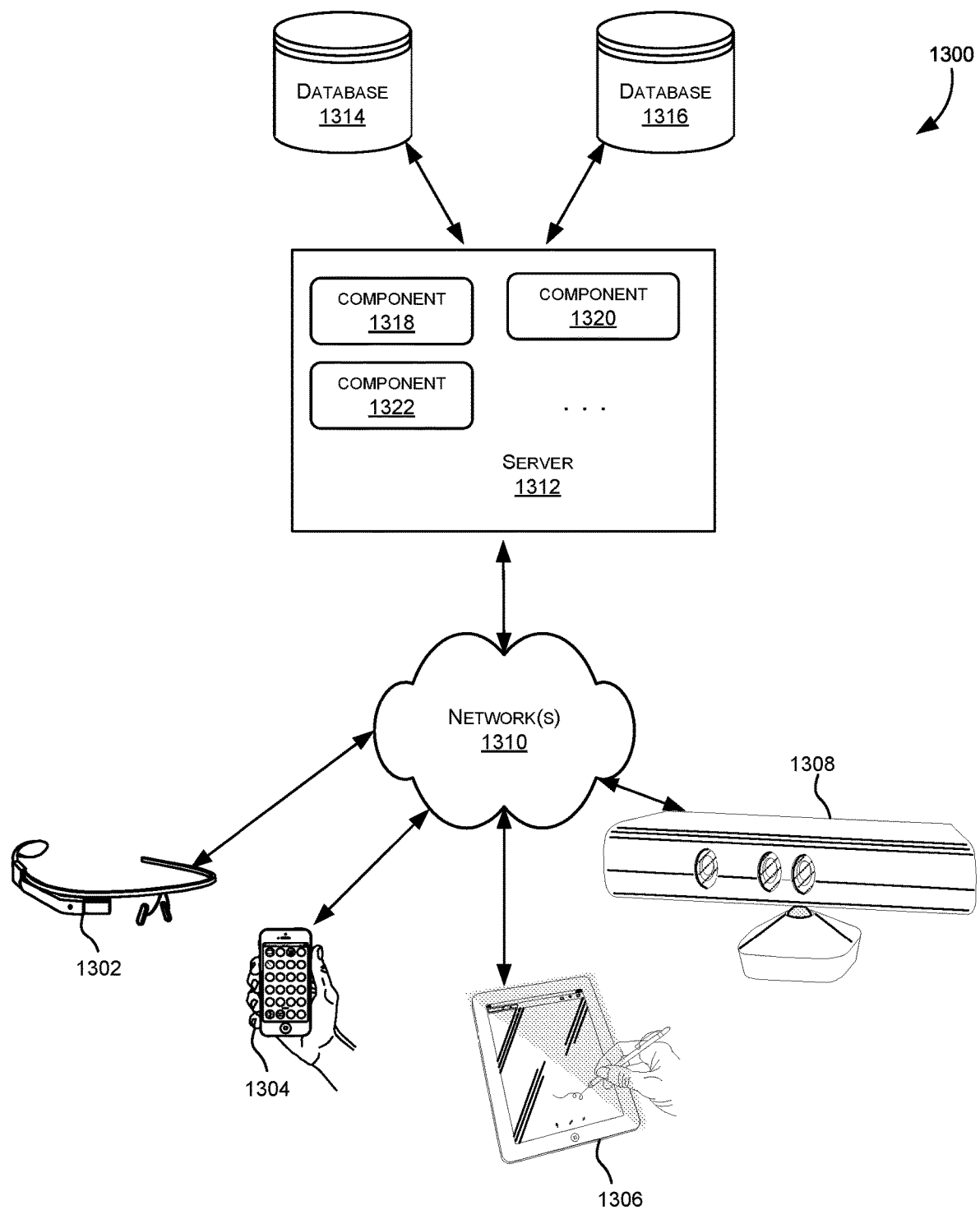
FIG. 13 illustrates a simplified block diagram of a distributed system for implementing some of the embodiments.

FIG. 13 depicts a simplified diagram of a distributed system 1300 for implementing one of the embodiments. In the illustrated embodiment, distributed system 1300 includes one or more client computing devices 1302, 1304, 1306, and 1308, which are configured to execute and operate a client application such as a web browser, proprietary client (e.g., Oracle Forms), or the like over one or more network(s) 1310. Server 1312 may be communicatively coupled with remote client computing devices 1302, 1304, 1306, and 1308 via network 1310.

In various embodiments, server 1312 may be adapted to run one or more services or software applications provided by one or more of the components of the system. In some embodiments, these services may be offered as web-based or cloud services or under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in the figure, the software components 1318, 1320 and 1322 of system 1300 are shown as being implemented on server 1312. In other embodiments, one or more of the components of system 1300 and/or the services provided by these components may also be implemented by one or more of the client computing devices 1302, 1304, 1306, and/or 1308. Users operating the client computing devices may then utilize one or more client applications to use the services provided by these components. These components may be implemented in hardware, firmware, software, or combinations thereof. It should be appreciated that various different system configurations are possible, which may be different from distributed system 1300. The embodiment shown in the figure is thus one example of a distributed system for implementing an embodiment system and is not intended to be limiting.

Client computing devices 1302, 1304, 1306, and/or 1308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1302, 1304, 1306, and 1308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1310.

Although exemplary distributed system 1300 is shown with four client computing devices, any number of client computing devices may be supported. Other devices, such as devices with sensors, etc., may interact with server 1312.

Network(s) 1310 in distributed system 1300 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1310 can be a local area network (LAN), such as one based on Ethernet, Token-Ring and/or the like. Network(s) 1310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1312 may be adapted to run one or more services or software applications described in the foregoing disclosure. For example, server 1312 may correspond to a server for performing processing described above according to an embodiment of the present disclosure.

Server 1312 may run an operating system including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more databases 1314 and 1316. Databases 1314 and 1316 may reside in a variety of locations. By way of example, one or more of databases 1314 and 1316 may reside on a non-transitory storage medium local to (and/or resident in) server 1312. Alternatively, databases 1314 and 1316 may be remote from server 1312 and in communication with server 1312 via a network-based or dedicated connection. In one set of embodiments, databases 1314 and 1316 may reside in a storage-area network (SAN). Similarly, any necessary files for performing the functions attributed to server 1312 may be stored locally on server 1312 and/or remotely, as appropriate. In one set of embodiments, databases 1314 and 1316 may include relational databases, such as databases provided by Oracle, that are adapted to store, update, and retrieve data in response to SQL-formatted commands.

Figure 14:
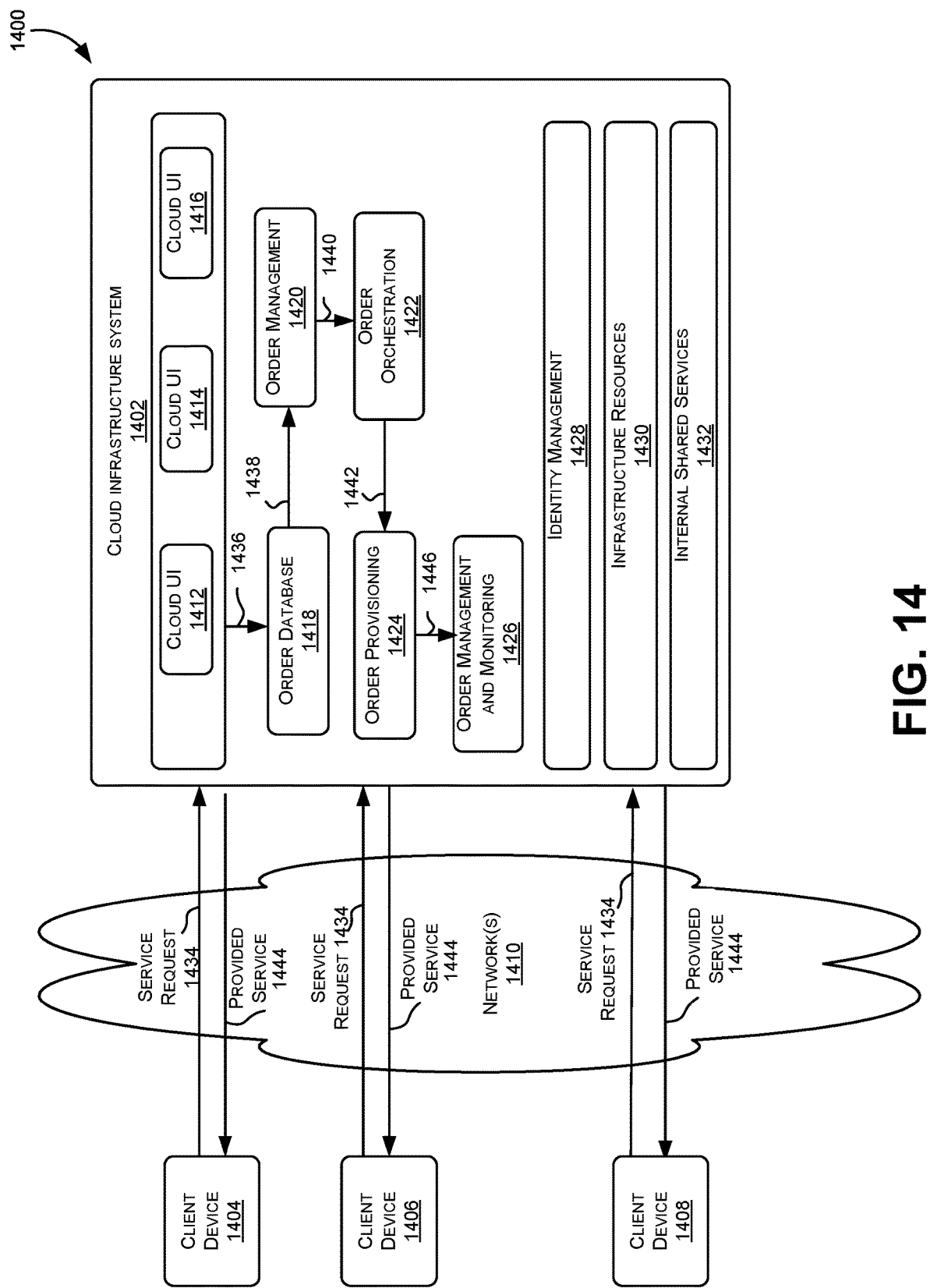
FIG. 14 illustrates a simplified block diagram of components of a system environment by which services provided by the components of an embodiment system may be offered as cloud services.

FIG. 14 is a simplified block diagram of one or more components of a system environment 1400 by which services provided by one or more components of an embodiment system may be offered as cloud services, in accordance with an embodiment of the present disclosure. In the illustrated embodiment, system environment 1400 includes one or more client computing devices 1404, 1406, and 1408 that may be used by users to interact with a cloud infrastructure system 1402 that provides cloud services. The client computing devices may be configured to operate a client application such as a web browser, a proprietary client application (e.g., Oracle Forms), or some other application, which may be used by a user of the client computing device to interact with cloud infrastructure system 1402 to use services provided by cloud infrastructure system 1402.

It should be appreciated that cloud infrastructure system 1402 depicted in the figure may have other components than those depicted. Further, the embodiment shown in the figure is only one example of a cloud infrastructure system that may incorporate some embodiments. In some other embodiments, cloud infrastructure system 1402 may have more or fewer components than shown in the figure, may combine two or more components, or may have a different configuration or arrangement of components.

Client computing devices 1404, 1406, and 1408 may be devices similar to those described above for 1302, 1304, 1306, and 1308.

Although exemplary system environment 1400 is shown with three client computing devices, any number of client computing devices may be supported. Other devices such as devices with sensors, etc. may interact with cloud infrastructure system 1402.

Network(s) 1410 may facilitate communications and exchange of data between clients 1404, 1406, and 1408 and cloud infrastructure system 1402. Each network may be any type of network that can support data communications using any of a variety of commercially-available protocols, including those described above for network(s) 1310.

Cloud infrastructure system 1402 may comprise one or more computers and/or servers that may include those described above for server 1312.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1402 may be adapted to automatically provision, manage and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some embodiments, the services provided by cloud infrastructure system 1402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some embodiments, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle JAVA Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and JAVA cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and JAVA cloud services may provide a platform for customers to deploy JAVA applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1402 may also include infrastructure resources 1430 for providing the resources used to provide various services to customers of the cloud infrastructure system. In one embodiment, infrastructure resources 1430 may include pre-integrated and optimized combinations of hardware, such as servers, storage, and networking resources to execute the services provided by the PaaS platform and the SaaS platform.

In some embodiments, resources in cloud infrastructure system 1402 may be shared by multiple users and dynamically re-allocated per demand. Additionally, resources may be allocated to users in different time zones. For example, cloud infrastructure system 1430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1432 may be provided that are shared by different components or modules of cloud infrastructure system 1402 and by the services provided by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1402, and the like.

In one embodiment, as depicted in the figure, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In exemplary operation 1434, a customer using a client device, such as client device 1404, 1406 or 1408, may interact with cloud infrastructure system 1402 by requesting one or more services provided by cloud infrastructure system 1402 and placing an order for a subscription for one or more services offered by cloud infrastructure system 1402. In certain embodiments, the customer may access a cloud User Interface (UI), cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 that the customer intends to subscribe to.

After an order has been placed by the customer, the order information is received via the cloud UIs, 1412, 1414 and/or 1416.

At operation 1436, the order is stored in order database 1418. Order database 1418 can be one of several databases operated by cloud infrastructure system 1418 and operated in conjunction with other system elements.

At operation 1438, the order information is forwarded to an order management module 1420. In some instances, order management module 1420 may be configured to perform billing and accounting functions related to the order, such as verifying the order, and upon verification, booking the order.

At operation 1440, information regarding the order is communicated to an order orchestration module 1422. Order orchestration module 1422 may utilize the order information to orchestrate the provisioning of services and resources for the order placed by the customer. In some instances, order orchestration module 1422 may orchestrate the provisioning of resources to support the subscribed services using the services of order provisioning module 1424.

In certain embodiments, order orchestration module 1422 enables the management of business processes associated with each order and applies business logic to determine whether an order should proceed to provisioning. At operation 1442, upon receiving an order for a new subscription, order orchestration module 1422 sends a request to order provisioning module 1424 to allocate resources and configure those resources needed to fulfill the subscription order. Order provisioning module 1424 enables the allocation of resources for the services ordered by the customer. Order provisioning module 1424 provides a level of abstraction between the cloud services provided by cloud infrastructure system 1400 and the physical implementation layer that is used to provision the resources for providing the requested services. Order orchestration module 1422 may thus be isolated from implementation details, such as whether or not services and resources are actually provisioned on the fly or pre-provisioned and only allocated/assigned upon request.

At operation 1444, once the services and resources are provisioned, a notification of the provided service may be sent to customers on client devices 1404, 1406 and/or 1408 by order provisioning module 1424 of cloud infrastructure system 1402.

At operation 1446, the customer's subscription order may be managed and tracked by an order management and monitoring module 1426. In some instances, order management and monitoring module 1426 may be configured to collect usage statistics for the services in the subscription order, such as the amount of storage used, the amount data transferred, the number of users, and the amount of system up time and system down time.

In certain embodiments, cloud infrastructure system 1400 may include an identity management module 1428. Identity management module 1428 may be configured to provide identity services, such as access management and authorization services in cloud infrastructure system 1400. In some embodiments, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.) Identity management module 1428 may also include the management of descriptive information about each customer and about how and by whom that descriptive information can be accessed and modified.

Figure 15:
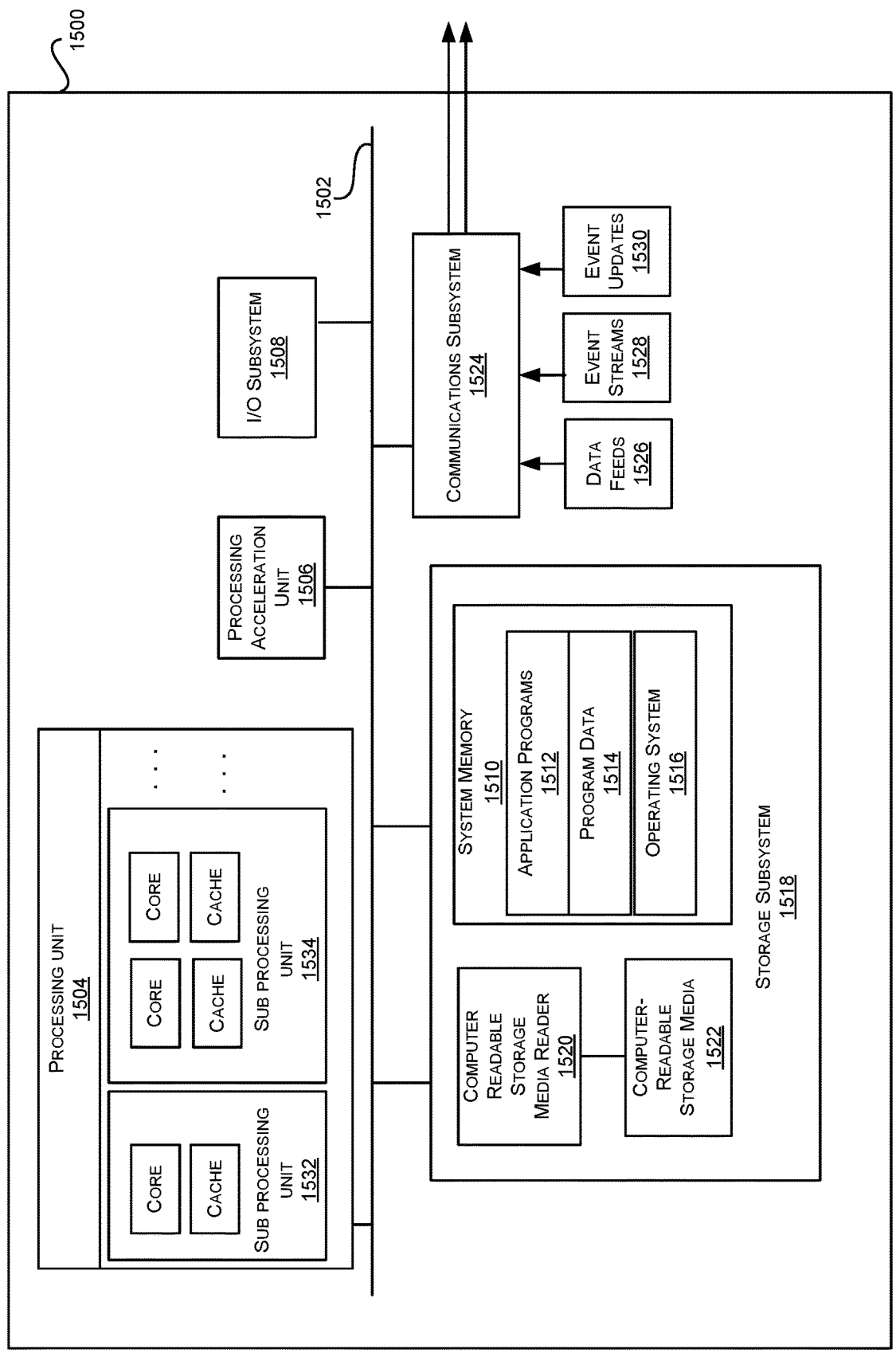
FIG. 15 illustrates an exemplary computer system, in which various embodiments may be implemented.

FIG. 15 illustrates an exemplary computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with some embodiments.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods may be used to implement the various embodiments.

In the foregoing description, for the purposes of explanation, numerous specific details were set forth in order to provide a thorough understanding of various embodiments. It will be apparent, however, that these embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments provide an enabling description for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of various embodiments are described with reference to specific embodiments thereof, but not all embodiments are limited thereto. Various features and aspects of the above-described embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
    creating, at the programming language framework, an instance of a dynamic validation class comprising a plurality of validators as an entry point for dynamic validation;
    receiving, at the programming language framework, an instance of an object at runtime, wherein a definition of the object is annotated with a constraint;
    receiving, at the programming language framework, one or more validators from the plurality of validators that are annotated with an annotation that identifies:
    an attribute in the definition of the object; and
    a value for an attribute in the definition of the object; and
    identifying, at the programming language framework, a validator in the one or more validators for which a value of the attribute in the instance of the object at runtime matches the value for the attribute in the annotation of the validator, wherein changing the value of the attribute at runtime changes the validator selected at runtime from the one or more validators.

2. The non-transitory computer-readable medium of claim 1, wherein the validator validates a value of an additional attribute in the definition of the object.

3. The non-transitory computer-readable medium of claim 1, wherein the one or more validators comprises a second validator for which the value of the attribute in the instance of the object does not match the value for the attribute in the annotation of the second validator.

4. The non-transitory computer-readable medium of claim 1, wherein the constraint with which the definition of the object is annotated causes the programming language framework to use dynamic validation rather than static validation.

5. The non-transitory computer-readable medium of claim 4, wherein the programming language framework comprises a definition for the constraint with which the definition of the object is annotated, wherein the definition for the constraint specifies that the constraint is compatible with object type targets.

6. The non-transitory computer-readable medium of claim 1, wherein the programming language framework comprises a definition for the annotation with which the one or more validators are annotated, wherein the definition comprises an attribute name and an attribute value pattern.

7. The non-transitory computer-readable medium of claim 1, wherein the programming language framework comprises a definition of an abstract class from which each of the one or more validators is inherited.

8. The non-transitory computer-readable medium of claim 7, wherein the abstract class comprises an abstract function that determines if a constraint is valid for an object.

9. The non-transitory computer-readable medium of claim 7, wherein the abstract class comprises a protected function that validates an object against custom constraints.

10. The non-transitory computer-readable medium of claim 1, wherein the programming language framework comprises a definition of a class that scans a class path and identifies each of the one or more validators in the class path.

11. The non-transitory computer-readable medium of claim 10, wherein the definition of the class includes a function that filters out ones of the one or more validators for which the value of the attribute in the instance of the object does not match the values for the attributes in the annotations of the ones of the one or more validators.

12. The non-transitory computer-readable medium of claim 10, wherein the definition of the class first executes any static validations before executing any dynamic validations.

13. The non-transitory computer-readable medium of claim 1, wherein the instance of the object comprises the attribute and an additional attribute.

14. The non-transitory computer-readable medium of claim 13, wherein the attribute determines which of the one or more validators should be used to validate a value assigned to the additional attribute.

15. The non-transitory computer-readable medium of claim 14, wherein the attribute comprises a key and the second additional attribute comprises a value in a key-value pair.

16. The non-transitory computer-readable medium of claim 15, wherein the key indicates a datatype of the value.

17. The non-transitory computer-readable medium of claim 1, wherein:
the validator is annotated with an additional annotation that identifies an additional attribute in the definition of the object and an additional value for the additional attribute; and a value of an additional attribute in the instance of the object matches the additional value for the additional attribute in the additional annotation of the validator.

18. A system comprising:
one or more processors; and
one or more memory devices comprising instructions that, when executed by the one or more processors, cause the one or more processors to perform operations comprising:
creating, at the programming language framework, an instance of a dynamic validation class comprising a plurality of validators as an entry point for dynamic validation;
receiving, at the programming language framework, an instance of an object at runtime, wherein a definition of the object is annotated with a constraint;
receiving, at the programming language framework, one or more validators from the plurality of validators that are annotated with an annotation that identifies:
an attribute in the definition of the object; and
a value for an attribute in the definition of the object; and
identifying, at the programming language framework, a validator in the one or more validators for which a value of the attribute in the instance of the object at runtime matches the value for the attribute in the annotation of the validator, wherein changing the value of the attribute at runtime changes the validator selected at runtime from the one or more validators.

19. A method of executing dynamic validation in programming language frameworks, the method comprising:
creating, at the programming language framework, an instance of a dynamic validation class comprising a plurality of validators as an entry point for dynamic validation;
receiving, at the programming language framework, an instance of an object at runtime, wherein a definition of the object is annotated with a constraint;
receiving, at the programming language framework, one or more validators from the plurality of validators that are annotated with an annotation that identifies:
an attribute in the definition of the object; and
a value for an attribute in the definition of the object; and
identifying, at the programming language framework, a validator in the one or more validators for which a value of the attribute in the instance of the object at runtime matches the value for the attribute in the annotation of the validator, wherein changing the value of the attribute at runtime changes the validator selected at runtime from the one or more validators.

* * * * *

UNITED STATES PATENT AND TRADEMARK OFFICE
CERTIFICATE OF CORRECTION

| | |
|---|---|
| PATENT NO. | : 11,604,625 B2 |
| APPLICATION NO. | : 17/466913 |
| DATED | : March 14, 2023 |
| INVENTOR(S) | : Pavel Bzoch |

It is certified that error appears in the above-identified patent and that said Letters Patent is hereby corrected as shown below:

In the Specification

In Column 4, Line 4, delete "XML," and insert -- XML --, therefor.

In Column 6, Line 33, delete "with in" and insert -- within --, therefor.

In Column 22, Line 23, delete "evolution)," and insert -- evolution)), --, therefor.

In the Claims

In Column 25, Line 46, in Claim 15, before "additional" delete "second", therefor.

Signed and Sealed this
Second Day of January, 2024

Katherine Kelly Vidal
*Director of the United States Patent and Trademark Office*